United States Patent
Clark et al.

(10) Patent No.: US 7,124,251 B2
(45) Date of Patent: Oct. 17, 2006

(54) STACK ALLOCATION SYSTEM AND METHOD

(75) Inventors: Jason Clark, Bothell, WA (US); Scott A. Field, Redmond, WA (US); Jonathan David Schwartz, Redmond, WA (US); Clifford P. Van Dyke, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 450 days.

(21) Appl. No.: 10/178,291

(22) Filed: Jun. 24, 2002

(65) Prior Publication Data

US 2004/0034742 A1    Feb. 19, 2004

(51) Int. Cl.
*G06F 12/00*    (2006.01)
(52) U.S. Cl. .................. 711/132; 711/100; 711/154; 711/170; 717/130; 717/133
(58) Field of Classification Search ........ 711/110–111, 711/132, 170–173, 162, 100; 717/100–178; 712/202
See application file for complete search history.

(56) References Cited

U.S. PATENT DOCUMENTS

| | | | |
|---|---|---|---|
| 5,950,221 A * | 9/1999 | Draves et al. ............... 711/100 |
| 6,286,130 B1 * | 9/2001 | Poulsen et al. ............. 717/119 |
| 6,434,743 B1 * | 8/2002 | Click et al. ................. 717/157 |
| 6,505,344 B1 * | 1/2003 | Blais et al. ................. 717/151 |
| 6,539,464 B1 * | 3/2003 | Getov ......................... 711/170 |
| 6,658,652 B1 * | 12/2003 | Alexander et al. .......... 717/128 |
| 2003/0154464 A1 * | 8/2003 | Ullmann et al. ............ 717/130 |
| 2003/0212988 A1 * | 11/2003 | Tsai et al. .................... 717/130 |

OTHER PUBLICATIONS

Microsoft Computer Dictionary (Fifth Edition).*
Randy Kath, "Mananging Virtual Memory in Win32", Jan. 1993, http://msdn.microsoft.com/library, pp. 1-9.
Ruediger R. Asche, "Multithreading for Rookies", Sep. 1993, http://msdn.microsoft.com/library, pp. 1-13.

* cited by examiner

*Primary Examiner*—Donald Sparks
*Assistant Examiner*—Hashem Farrokh
(74) *Attorney, Agent, or Firm*—Lee & Hayes, PLLC

(57) ABSTRACT

A stack allocation system and method is described. In one implementation, an attempt is made to allocate N bytes of data to a stack having a fixed depth. A probe size for the stack is determined. Verification is then made to ascertain whether the probe size and the N bytes of data exceed the fixed depth of the stack, prior to allocating the N bytes of data to the stack. In another implementation, the N bytes of data are allocated to a heap; if the probe size and the N bytes of data exceed the fixed depth of the stack.

29 Claims, 4 Drawing Sheets

STACK ALLOCATION SYSTEM AND METHOD

TECHNICAL FIELD

This invention relates to stack memory allocation in computer systems.

BACKGROUND

A stack is a region of memory in which programs store data such as procedure and function call return addresses, passed parameters, local variables and other related status data. Various entities can maintain one or more stacks, including for instance, the processor, programs and the operating system. Some stacks are implemented as a region in virtual memory. A pointer, referred to as the "stack pointer" is used to reference virtual memory locations in the stack when reading and writing data to physical memory locations indicated by the virtual memory locations. The reference pointer is also used when reading and writing data directly to the stack.

An allocate-on-demand stack typically consists of two regions: an allocated region and a guard region. The guard region is not mapped to physical memory. The guard region is a reserved portion of non-committed virtual memory that bounds the outermost limit of the currently allocated stack memory. In other words, it is a range of virtual addresses into which the stack pointer can be advanced, but for which actual physical memory has not yet been committed.

When a program attempts to access a guard region a memory fault is generated, referred to as a "stack overflow exception." The exception is typically handled by some type of exception handling block. Most executing programs will not fail at this point and the overflow exception is handled transparently to a user. However, if the system cannot commit memory for a now-longer stack, the "stack overflow exception" is considered unhandled which causes a catastrophic program failure.

The stack can also be extended programmatically through a high performance memory allocator function called "allocate-a" indicated in source code as "alloca( )." Unfortunately, with fixed sized stacks and robust program threads, the allocate-a function can cause an stack overflow exception due to exhaustion of the stack or exhaustion of memory or page file. Accordingly, because of the limitations noted above, the allocate-a function is unable to prevent stack overflow exceptions from occurring when allocating data to a stack beyond the available depth of the stack.

SUMMARY

A stack allocation system and method is described. In one implementation, an attempt is made to allocate N bytes of data to a stack having a fixed depth. A probe size for the stack is determined. Verification is then made to ascertain whether the probe size and the N bytes of data exceed the fixed depth of the stack, prior to allocating the N bytes of data to the stack.

In another implementation, the N bytes of data are allocated to a heap if the probe size and the N bytes of data exceed the fixed depth of the stack.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

The following discussion is directed to stack memory allocation. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

The following discussion introduces the broad concept of safely allocating data to a stack without causing a stack overflow exception, even though the allocated data may exceed a generally fixed depth of the stack. This is accomplished by probing the available stack depth prior to allocating data to the stack. In the event that intended allocated data exceeds the allocated stack depth, the allocation is routed to a heap.

Figure 1:
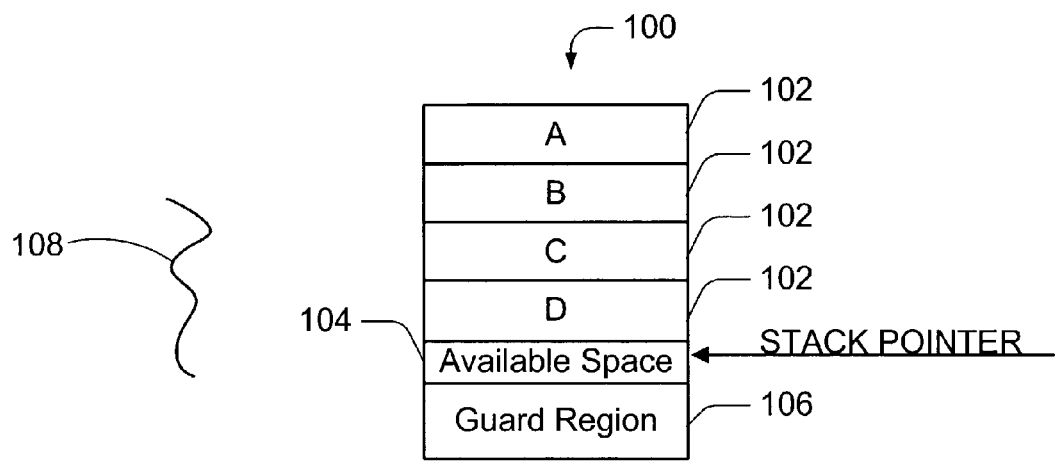
FIG. 1 is a block diagram illustrating a stack and the use of a guard region.

FIG. 1 is a block diagram illustrating a stack 100 and the use of a guard region 106. In the exemplary implementation, stack 100 represents a memory thread stack having a fixed depth. That is, the size of the stack 100 generally has a fixed amount of space that is known in advance of actual compile time and is typically not dynamically re-sizable. Nevertheless, although described with respect to a fixed-size stack, the concepts described herein can be applied to stacks that can be dynamically resized.

To the left of stack 100 is an associated thread 108, which is generally defined as a code of sequences that operate multitasked on individual stacks, such as stack 100. Associated with the exemplary thread 108 are functions A, B, C and D (generally referenced as 102 in FIG. 1). Each function 102 includes N bytes of data, where N is any number greater than zero. It is appreciated that a function may be any data size including any combination of bytes.

Stack 100 is typically implemented as a region in virtual memory beginning at some stack base address. As each function 102 is called, they are placed on the stack 100 and a stack pointer is moved to a next available address to receive data. The guard region 106 provides a reserved region of non-committed virtual memory that bounds the outermost limit of allocated data to stack 100. In other words, the stack pointer cannot be advanced beyond a generally fixed address for stack 100 indicated by the guard region 106 without causing a stack overflow exception as described above.

Figure 2:
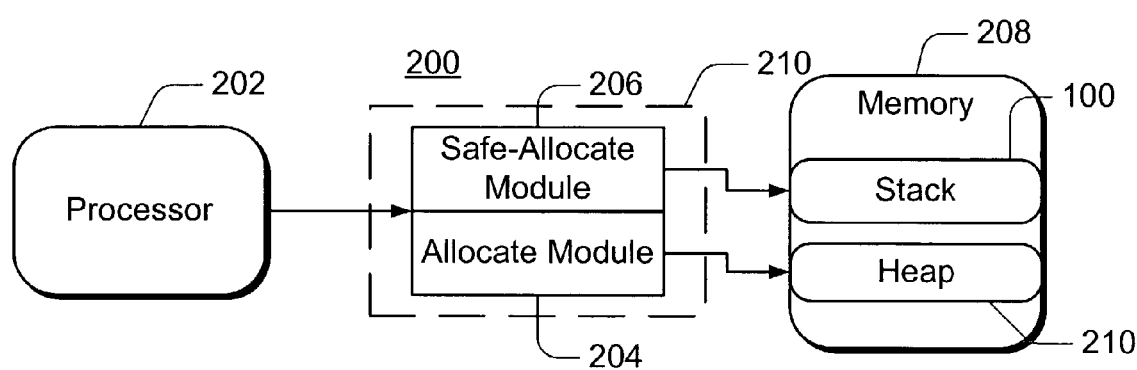
FIG. 2 shows select components of a computer system.

FIG. 2 shows select components of a computer system 200. Computer system 200 can be any of one of a variety of different types of devices such as the exemplary computer 502 described below with reference to FIG. 5. Computer system 200 includes at least one processor 202 and memory 208. Memory 208 represents a broad range of memory including virtual memory in which exemplary stack 100 is maintained.

Also shown in FIG. 2 are two logic modules: an allocate module 204 and a safe-allocate module 206, both of which are functions that can be called by processor 202 when allocating data to a stack such as stack 100. In one implementation, the allocate module 204 and safe-allocate module 206 are a set of functions maintained as part of a Microsoft® C run-time (CRT) library (not shown) within memory management system 210. The combination of the allocate module 204 and safe-allocate module 206 serve as a stack allocator (in the form or logic and/or computer-executable instructions forming a logic module) for computer system 200.

Application programs call safe-allocate module 206 to ensure that when data is allocated to a stack, the data is allocated safely preventing most occurrences of a stack overflow exception failure. This is accomplished in several ways. In one implementation, safe-allocate module 206 probes the stack prior to allocating data. If the event there is an overflow on the stack 100 or the guard region 106 cannot be extended, safe allocate module 206 attempts to route the data overflowing the available space on the stack 100 to a heap 212 after replacing the guard region.

Probing the Stack

In one exemplary implementation, safe-allocate module 206 determines a probe size of a stack. Accordingly, when a program operating on processor 202 attempts to allocate N bytes of data associated with a particular function 102 to a fixed-depth stack 100, safe-allocate module 206 determines the probe size for the stack and then ensures that the N bytes of data to be allocated plus the probe size do not exceed the available fixed-depth of the stack 100.

Suppose, for example purposes that a program is attempting to dynamically allocate 1K of data to stack 100. If the allocate module 204 performed the allocation independently of the safe-allocate module 206, allocate module 204 would allocate the 1K of data for Function C to stack 100 and would not ascertain whether future functions have enough space to be allocated to the stack. So, if the stack only has 2K of available space left and an attempt is made to allocate Function D (where function D is 3K) to the stack 100, then there is not enough space left of the stack 100 for Function D to be successfully allocated. Thus, the allocation of Function D may fail.

To address this problem, safe-allocate module 206 adds a size to the number of bytes that is requested to be allocated to the stack 100. For example, suppose a program desires to allocate data to the stack, but the stack requires 1K of available stack space after the data is allocated. Safe-allocate module 206 will add a probe size to 1K. The probe size is an estimate of additional space needed on the stack when receiving a command to allocate a function to the stack. So, even if there is 1K of space available on the stack in this example, an additional amount of space is needed for other future subfunction allocations. For instance, suppose when function C is allocated, in this example, that the probe size is 4K. Prior to allocating Function C, safe-allocate module 206 attempts to allocate 1K (for Function C) plus 4K (for the probe size) for a total 5K. In the event there is a total of 5K available on the stack 100, then Function C can be allocated by allocate module 204.

On the other hand, if there isn't enough room to allocate the 5K of code (the 5K code hits the guard region 106), then safe allocate module 206 will attempt to extend the stack 100 to permit the allocation, by moving the guard region down to a higher address to accommodate the additional space needed on the stack. Alternatively, safe allocate module 206 can determine whether there is enough room on the stack without moving the guard region 106, by leaving the guard region intact if the allocation fails. If the additional space needed can be provided by extending the guard region, then when Function C calls Function D, there isn't an allocation problem, because there is extra space on the stack 100 for Function D.

If the guard region 106 cannot be moved, because the address space has already been committed or reserved in real virtual memory or the allocation requires the stack pointer to go past reserved space of the guard region in its entirety, then safe-allocate module 206 will attempt to allocate to the heap 210 after handing the generated stack overflow exception.

Routing to the Heap

Figure 3:
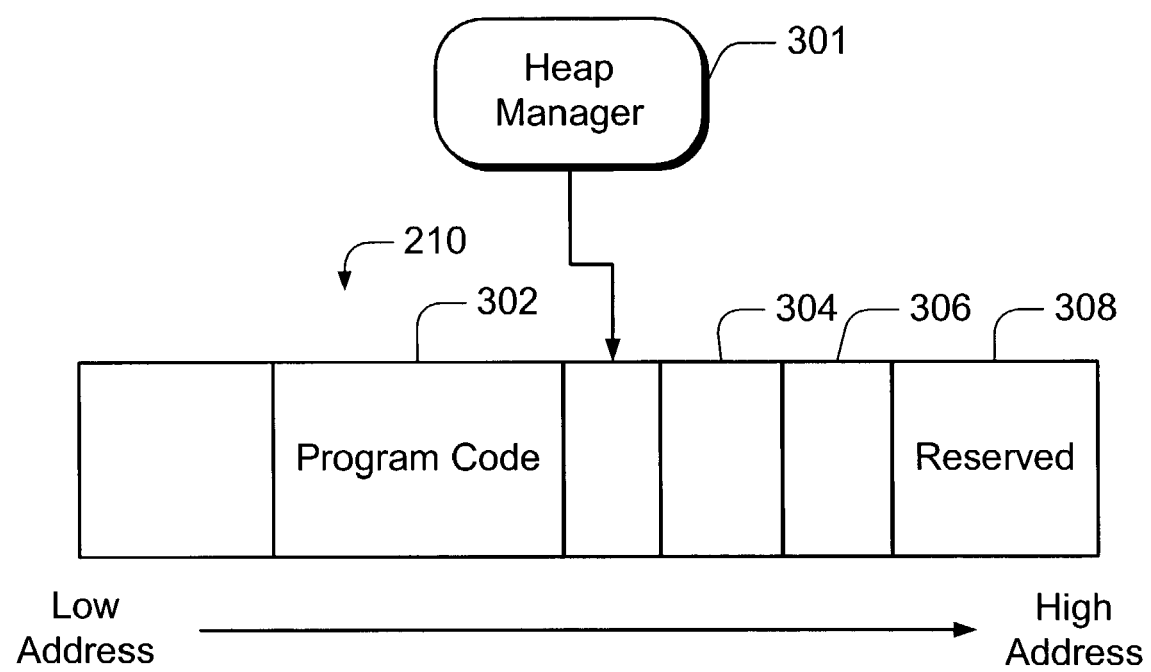
FIG. 3 is a block diagram illustrating a heap and a heap manager.

FIG. 3 is a block diagram illustrating the heap 210 in more detail. The heap 210 is a portion of memory 208 traditionally used by programs to store data whose existence or size cannot be determined until the program is running on the processor(s) 202. The program can request free memory from the heap to hold such elements, use it as necessary, and later free the memory 208. Programming languages such as C interact with the heap manager 301 to request and free memory from the heap 210. How computer system 200 uses the heap 300 to route data from stacks shall now be described in more detail with reference to FIGS. 3, 4 and 5.

Figure 4:
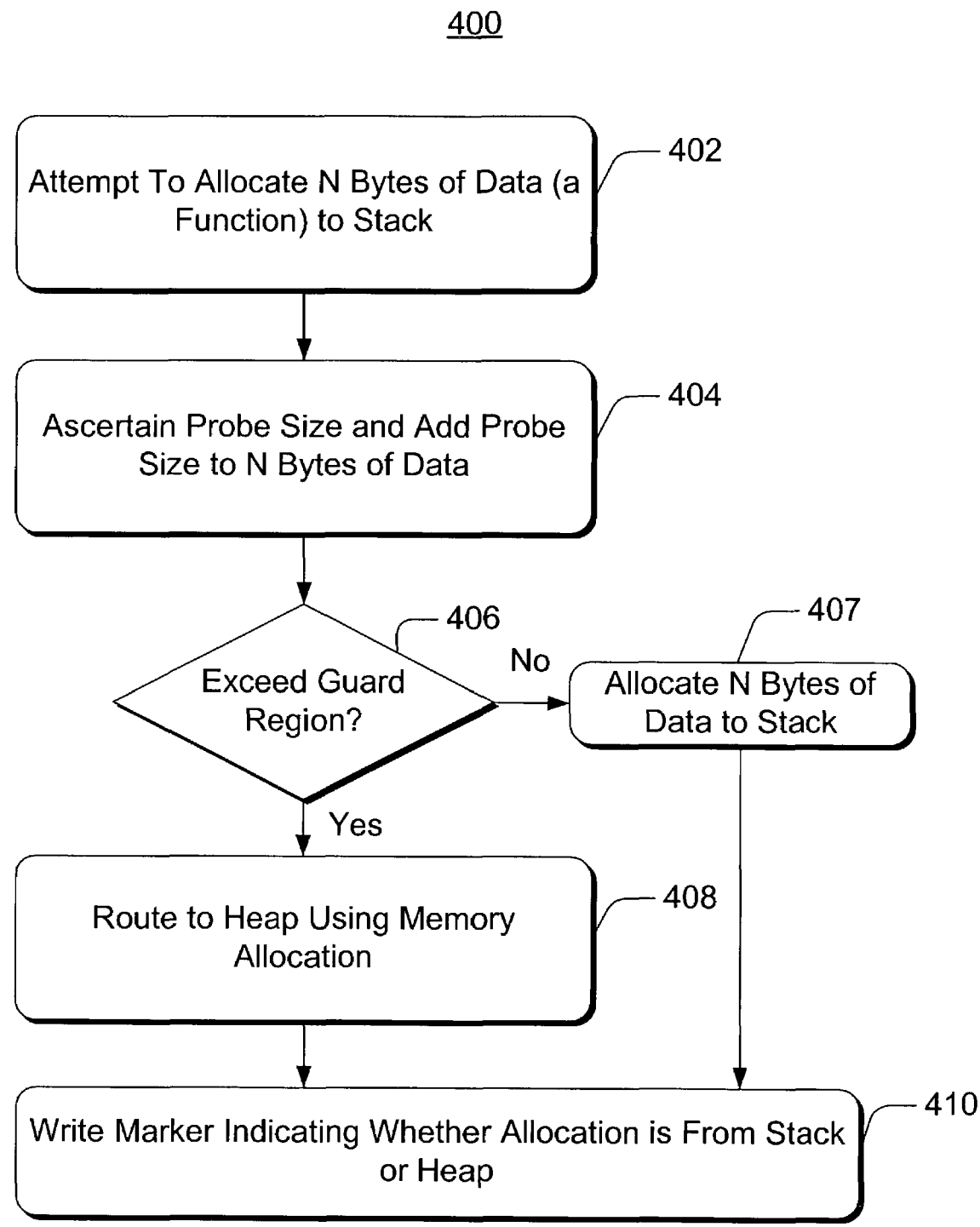
FIG. 4 is a flow chart illustrating a process in which a computer system routes data to a heap, in the event an allocated region cannot be extended after probing the stack.

FIG. 4 is a flow chart illustrating a process 400 in which computer system 200 allocates to the heap 210, if the guard region 106 of the stack 100 cannot be extended after probing the stack. Process 400 includes various operations illustrated as blocks. The order in which the process is described is not intended to be construed as a limitation. Furthermore, the process can be implemented in any suitable hardware, software, firmware, or combination thereof. In the exemplary implementation, the majority of operations are performed in software (such as in the form of modules or programs) running on computer system 200.

At a block 402, an attempt is made to allocate to stack 100. At a block 404, safe-allocate module 206 is called by processor 202 to ascertain the probe size for stack 100. Safe-allocate module 206, after determining the probe size, adds the probe size to the N bytes of data to be allocated.

At a block 406, a determination is made whether the probe size together with the size of the data to be allocated would exceed the guard region 106. If according to the No branch of block 406, the probe size and function do not exceed the guard region, then according to block 407 the N bytes of data associated with the function 102 can be directly allocated to the stack 100 by allocate module 204.

On the other hand, if according the Yes branch of block 406, the probe size together with the size of the allocated data exceeds the maximum allowable stack allocation 106, then according to a block 408, safe-allocate module 206 routes the function to the heap 210. Safe-allocate module 206 contacts the heap manager 301 through standard Application Programming Interfaces (API) using native CRT functions such as "Memory Allocate" to allocate data from the heap 210.

At a block 410, whether the allocation was to the stack (see block 407) or to the heap 210 (see block 408), safe-allocate module 206 inserts a marker into the allocation indicating whether the allocation originated from the stack or heap. Safe-allocate uses this information later to determine whether to free-up data (e.g., when a program calls the free routine associated with the safe-allocate code).

Exemplary Computing System and Environment

Figure 5:
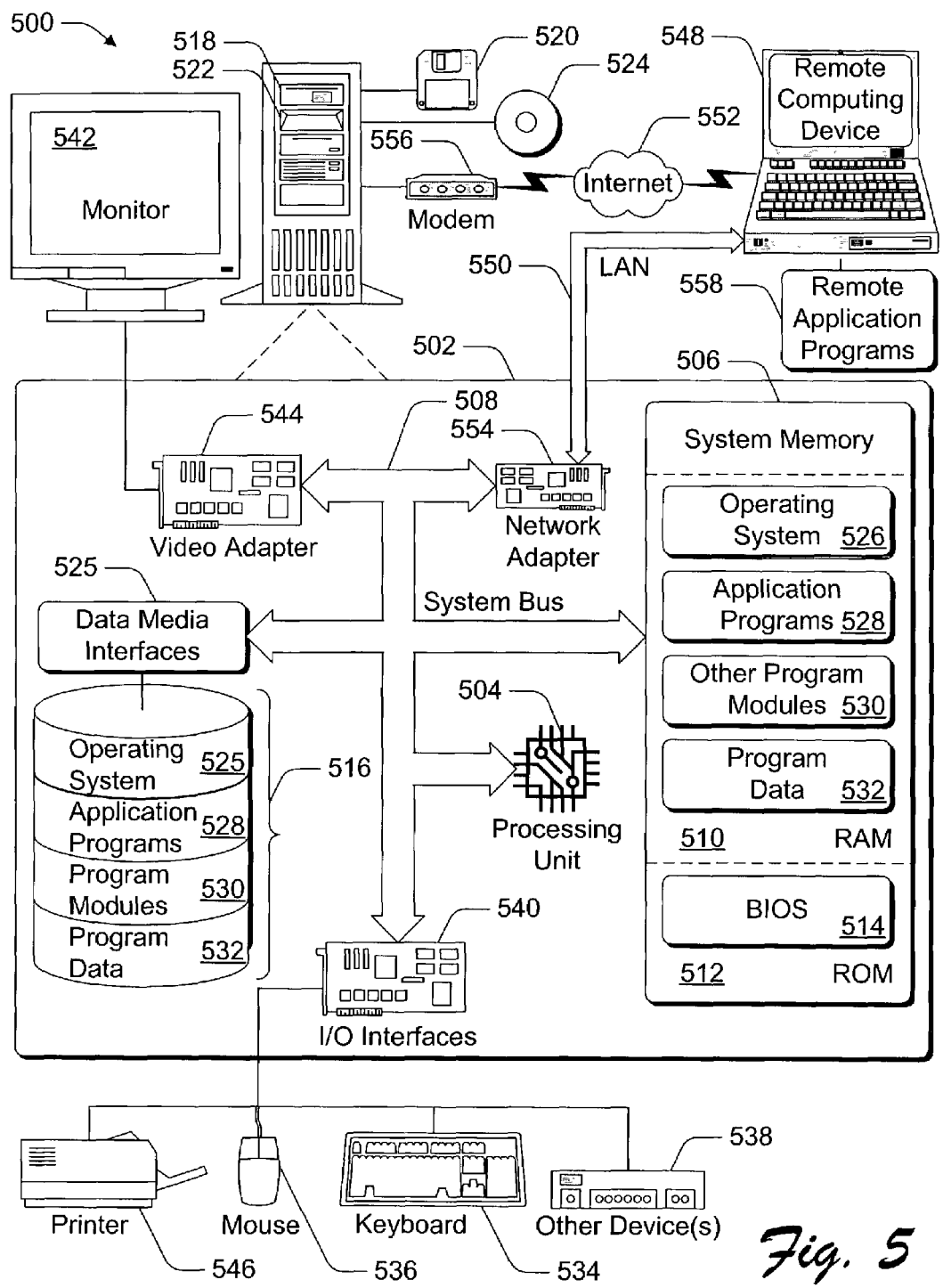
FIG. 5 illustrates an example of a computing environment within which the computer, network, and system architectures described herein can be either fully or partially implemented.

FIG. 5 illustrates an example of a computing environment 500 within which the computer, network, and system architectures (such as computer system 200) described herein can be either fully or partially implemented. Exemplary computing environment 500 is only one example of a computing system and is not intended to suggest any limitation as to the scope of use or functionality of the network architectures. Neither should the computing environment 500 be interpreted as having any dependency or requirement relating to any one or combination of components illustrated in the exemplary computing environment 500.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Safe-allocate module 206 may be described in the general context of computer-executable instructions, such as program modules, being executed by a computer. Generally, program modules include routines, programs, objects, components, data structures, etc. that perform particular tasks or implement particular abstract data types. Safe-allocate module 206 may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing system in the form of a computer 502. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 502 typically includes a variety of computer readable media. Such media can be any available media that is accessible by computer 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM is 512. RAM 510 typically contains data and/or program modules that are immediately accessible to and/or presently operated on by the processing unit 504.

Computer 502 can also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by a SCSI interface (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may include an embodiment of the safe-allocate module 206.

Computer system 502 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer system 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication is link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computer system 502, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method, comprising:
    attempting to allocate N bytes of data to a stack, the stack having fixed depth;
    determining a probe size for the stack;
    verifying whether the probe size and the N bytes of data exceed the fixed depth of the stack, prior to allocating the N bytes of data to the stack;
    allocating the N bytes of data to the stack, if the probe size and the N bytes of data do not exceed the fixed depth of the stack; and
    allocating the N bytes to a separate heap if the probe size and the N bytes of data exceed the fixed depth of the stack.

2. The method as recited in claim 1, wherein the stack is a thread stack.

3. The method as recited in claim 1, further comprising allocating the N bytes of data to the stack using an allocate routine, if the probe size and the N bytes of data does not exceed the fixed depth of the stack.

4. The method as recited claim 1, further comprising routing the N bytes to a separate heap, using a memory allocate routine, if the probe size and the N bytes of data exceeds the fixed depth of the stack.

5. One or more computer storage media comprising computer-executable instructions that, when executed, perform the method as recited in claim 1.

6. A method, comprising:
    allocating N bytes of data on a stack, the stack having fixed size to receive data; and
    if the N bytes of data exceeds the fixed size of the stack, then allocating the N bytes of data to a separate heap, wherein the fixed size of the stack includes the N bytes of data and a probe size of the stack.

7. The method as recited in claim 6, further comprising writing a marker onto the returned allocation indicating whether the N bytes of data were allocated on the stack or the separate heap.

8. The method as recited in claim 6, wherein the stack is a thread stack.

9. The method as recited in claim 6, wherein N is any number greater than zero.

10. One or more computer storage media comprising computer-executable instructions that, when executed, perform the method as recited in claim 6.

11. An apparatus, comprising:
    a processor;
    a memory coupled to the processor; the memory including a stack having fixed depth;
    a display coupled to the processor;
    at least one input device coupled to the processor; and
    a stack allocator, coupled to the processor, for receiving a request to allocate a function to the stack, the stack allocator configured to determine a probe size for the stack; and verify whether the probe size and the function exceeds the fixed depth of the stack, prior to allocating the function to the stack, wherein the stack allocator is further configured to allocate the function to the stack if the probe size and the function do not exceed the fixed depth of the stack.

12. The apparatus as recited in claim 11, wherein the memory further includes a separate heap and wherein the stack allocator is further configured to allocate the function to the separate heap, if the probe size and the function exceeds the fixed depth of the stack.

13. The apparatus as recited in claim 11, wherein the apparatus is a computer.

14. The apparatus as recited in claim 11, wherein the stack is a thread stack.

15. The apparatus as recited in claim 11, wherein the stack allocator is further configured to allocate the function to the stack by calling an "allocate a module" routine, if the probe size and the function does not exceed the fixed depth of the stack.

16. The apparatus as recited claim 11, wherein the stack allocator is further configured to route the function to a separate heap by calling a safe-allocate routine if the probe size and function exceeds the fixed depth of the stack.

17. A system, comprising:
   means for attempting to allocate N bytes of data on a stack, the stack having a-fixed size to receive data; and
   means for allocating the N bytes of data that exceeds the fixed size of the stack to a separate heap, wherein the fixed size of the stack includes the N bytes of data and a probe size of the stack.

18. The system as recited in claim 17, further comprising means for writing a marker onto the allocation indicating whether the allocation was made on the stack or the separate heap.

19. The system as recited in claim 17, wherein the N bytes of data are at least a portion of a thread.

20. The system as recited in claim 17, wherein the stack is a thread stack.

21. The system as recited in claim 17, wherein N is any number greater than zero.

22. One or more computer storage media having stored thereon computer executable instructions that, when executed by one or more processors, causes the one or more processors of a computer system to:
   attempt to allocate N bytes of data to a stack, the stack having fixed depth;
   determine a probe size for the stack;
   verify whether the probe size and the N bytes of data exceeds the fixed depth of the stack, prior to allocating the N bytes of data to the stack; and
   direct the computer system to allocate the N bytes of data to the stack, if the probe size and the N bytes of data do not exceed the fixed depth of the stack.

23. One or more computer storage media as recited in claim 22, further comprising computer executable instructions that, when executed, direct the computer system to allocate the N bytes to a separate heap if the probe size and the N bytes of data exceeds the fixed depth of the stack.

24. One or more computer storage media as recited in claim 22, further comprising computer executable instructions that, when executed, direct the computer system to allocate the N bytes of data to the stack using an allocate routine, if the probe size and the N bytes of data does not exceed the fixed depth of the stack.

25. One or more computer storage media as recited in claim 22, further comprising computer executable instructions that, when executed, direct the computer system to route the N bytes to a separate heap, using a memory allocate routine, if the probe size and the N bytes of data exceeds the fixed depth of the stack.

26. One or more computer storage media having stored thereon computer executable instructions that, when executed by one or more processors, causes the one or more processors of a computer system to:
   attempt to allocate N bytes of data to a stack, the stack having a fixed size to receive data; and
   allocate the N bytes of data that exceeds the available size of the stack to a separate heap; wherein the fixed size of the stack includes the N bytes of data and a probe size of the stack.

27. One or more computer storage media as recited in claim 26, further comprising computer executable instructions that, when executed, direct the computer system to write a marker onto the allocation indicating whether the N bytes of data is allocated on the stack or on the separate heap.

28. One or more computer storage media as recited in claim 26, wherein the stack is a thread stack.

29. One or more computer storage media as recited in claim 26, wherein N is any number greater than zero.

* * * * *